United States Patent
Chang

(10) Patent No.: US 11,982,828 B2
(45) Date of Patent: May 14, 2024

(54) DISPLAY DEVICE

(71) Applicant: E Ink Holdings Inc., Hsinchu (TW)

(72) Inventor: Chien-Hsing Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/171,290

(22) Filed: Feb. 17, 2023

(65) Prior Publication Data

US 2023/0324594 A1 Oct. 12, 2023

(30) Foreign Application Priority Data

Apr. 6, 2022 (TW) .................................. 111113007

(51) Int. Cl.
*F21V 8/00* (2006.01)
(52) U.S. Cl.
CPC .................................... *G02B 6/003* (2013.01)
(58) Field of Classification Search
CPC ..................................................... G02B 6/003
See application file for complete search history.

(56) References Cited

U.S. PATENT DOCUMENTS

| | | | |
|---|---|---|---|
| 7,569,330 B2 | 8/2009 | Kobayashi et al. | |
| 9,077,791 B2 | 7/2015 | Jeong et al. | |
| 9,442,238 B2 | 9/2016 | Chen et al. | |
| 9,927,650 B1 | 3/2018 | Almanza-Workman et al. | |
| 10,073,211 B1 | 9/2018 | Almanza-Workman et al. | |
| 11,016,327 B2 | 5/2021 | Tang et al. | |
| 2012/0268656 A1 * | 10/2012 | Takano | G02B 6/003 362/602 |
| 2014/0027709 A1 * | 1/2014 | Higginson | H01L 33/62 438/26 |
| 2014/0369067 A1 | 12/2014 | Chen et al. | |
| 2015/0147550 A1 * | 5/2015 | Kitayama | C08F 8/32 525/85 |
| 2015/0355399 A1 | 12/2015 | You et al. | |
| 2018/0143369 A1 * | 5/2018 | Kim | G02B 6/0035 |
| 2019/0137798 A1 * | 5/2019 | Lee | G02F 1/133512 |
| 2021/0011332 A1 | 1/2021 | Oh et al. | |
| 2023/0011051 A1 * | 1/2023 | Schwager | G06F 1/1637 |

FOREIGN PATENT DOCUMENTS

| | | |
|---|---|---|
| TW | M557369 | 3/2018 |
| TW | 202135174 | 9/2021 |

\* cited by examiner

*Primary Examiner* — Donald L Raleigh
(74) *Attorney, Agent, or Firm* — JCIPRNET

(57) ABSTRACT

A display device includes a light guide plate, a cover lens, a first optical layer, a second optical layer and a display. The light guide plate has a first surface and a second surface opposite to the first surface. The cover lens is disposed on the first surface of the light guide plate. The first optical layer is disposed between the first surface and the cover lens. The second optical layer is disposed between the first surface and the first optical layer. For visible light, a light absorption rate of the first optical layer is larger than or equal to a light absorption rate of the second optical layer. The display is disposed on the second surface of the light guide plate.

10 Claims, 1 Drawing Sheet

DISPLAY DEVICE

CROSS-REFERENCE TO RELATED APPLICATION

This application claims the priority benefit of Taiwan application serial no. 111113007, filed on Apr. 6, 2022. The entirety of the above-mentioned patent application is hereby incorporated by reference herein and made a part of this specification.

BACKGROUND

Technical Field

The disclosure relates to an optical device, and in particular, to a display device.

Description of Related Art

In general, a display device includes a light source module and a display module. The light source module includes a light source, a light guide plate, and a cover lens, and a shielding layer is usually disposed between the light guide plate and the cover lens to shield light and prevent light from passing through. However, part of the light may still leak from the sidewall of the cover lens or the edge of the shielding layer, resulting in light leakage in the display device.

SUMMARY

The disclosure provides a display device capable of reducing light leakage of the display device.

The display device of the disclosure includes a light guide plate, a cover lens, a first optical layer, a second optical layer, and a display. The light guide plate has a first surface and a second surface opposite to the first surface. The cover lens is disposed on the first surface of the light guide plate. The first optical layer is disposed between the first surface and the cover lens. The second optical layer is disposed between the first surface and the first optical layer. For visible light, a light absorption rate of the first optical layer is larger than or equal to a light absorption rate of the second optical layer. The display is disposed on the second surface of the light guide plate.

In an embodiment of the disclosure, the first optical layer is disposed on the cover lens.

In an embodiment of the disclosure, the material of the first optical layer includes an organic pigment or dye or an inorganic pigments or dye.

In an embodiment of the disclosure, a light transmission rate of the second optical layer is smaller than a light transmission rate of the first optical layer.

In an embodiment of the disclosure, the second optical layer is a dark ink disposed on the first optical layer and in contact with the first optical layer.

In an embodiment of the disclosure, the first optical layer is attached to the cover lens, and the first optical layer has a first absorption axis.

In an embodiment of the disclosure, the second optical layer is attached to the first optical layer, and the second optical layer has a second absorption axis, in which a direction of the second absorption axis is different from a direction of the first absorption axis.

In an embodiment of the disclosure, the direction of the second absorption axis and the direction of the first absorption axis are perpendicular to each other.

In an embodiment of the disclosure, the first optical layer includes a first opening, the second optical layer includes a second opening, and a position of the first opening corresponds to a position of the second opening.

In an embodiment of the disclosure, the display device further includes an adhesive layer disposed between the light guide plate and the cover lens and covering the first optical layer and the second optical layer.

Based on the above, the display device of the disclosure includes a first optical layer disposed between the light guide plate and the cover lens, the second optical layer is disposed between the light guide plate and the first optical layer, and for visible light, the light absorption rate of the first optical layer is larger than or equal to the light absorption rate of the second optical layer. Therefore, light leakage from the sidewall of the cover lens or the edge of the second optical layer can be reduced, thereby improving the problem of light leakage of the display device.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
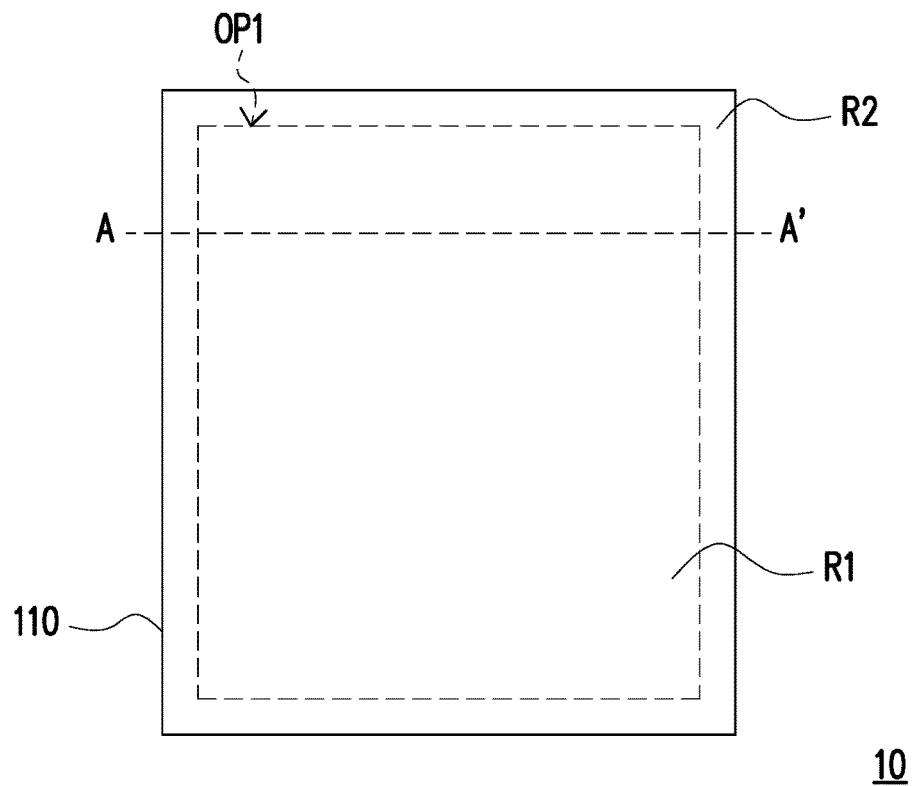
FIG. 1 is a schematic top view of a display device according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

Figure 2:
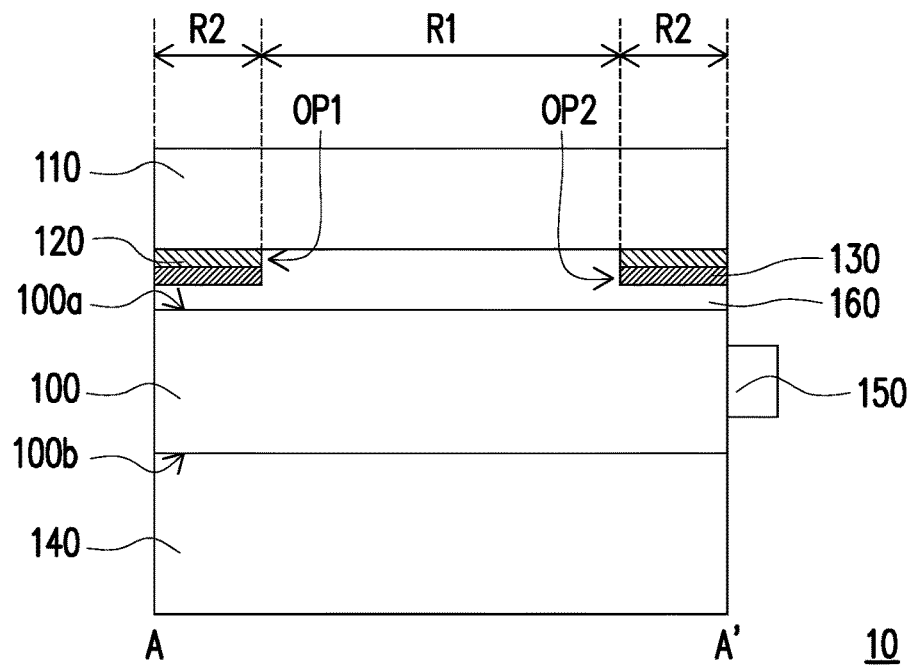
FIG. 2 is a schematic cross-sectional view taken along a section line A-A' of FIG. 1.

FIG. 1 is a schematic top view of a display device according to an embodiment of the disclosure. FIG. 2 is a schematic cross-sectional view taken along a section line A-A' of FIG. 1. For the sake of clarity, some components are omitted in FIG. 1, and the omitted parts can be understood with reference to FIG. 2.

Referring to FIGS. 1 and 2, a display device 10 includes a light guide plate 100, a cover lens 110, a first optical layer 120, a second optical layer 130, and a display 140. The light guide plate 100 has a first surface 100a and a second surface 100b opposite to the first surface 100a. The cover lens 110 is disposed on the first surface 100a of the light guide plate 100. The first optical layer 120 is disposed between the first surface 100a of the light guide plate 100 and the cover lens 110, and the second optical layer 130 is disposed between the first surface 100a of the light guide plate 100 and the first optical layer 120. For visible light, a light absorption rate of the first optical layer 120 is larger than or equal to a light absorption rate of the second optical layer 130. The display 140 is disposed on the second surface 100b of the light guide plate 100.

In one embodiment, the display 140 may be, for example, a reflective display, but the disclosure is not limited thereto. For example, the display 140 may include an electrophoretic display, an electrowetting display, a reflective liquid crystal display, or other reflective displays. The display light provided by the display 140 may allow a display region R1 to present screens. In one embodiment, the display device 10 further includes a light source 150 disposed to emit light toward a light incident surface (e.g. a side surface connected between the first surface 100a and the second surface 100b) of the light guide plate 100. The light guide plate 100, the cover lens 110, the first optical layer 120, the second optical layer 130, and the light source 150 may constitute a front light module, but the disclosure is not limited thereto. In one embodiment, the display device 10 further includes an adhesive layer 160 disposed between the light guide plate 100 and the cover lens 110 and covering the first optical layer 120 and the second optical layer 130. The adhesive layer 160 may be, for example, an optical glue, for bonding the light guide plate 100 and the cover lens 110. In one embodiment, the material of the light guide plate 100 may include glass, polycarbonate (PC), poly(methyl methacrylate) (PMMA) or other suitable organic or inorganic materials, the disclosure is not limited thereto. In one embodiment, the cover lens 110 may be a light-transmitting material, such as glass, plastic or other suitable materials.

In one embodiment, for visible light, the light absorption rate of the first optical layer 120 is between 40%-50%. In one embodiment, the first optical layer 120 may be directly disposed on the cover lens 110. The material of the first optical layer 120 may include an organic pigment or dye, inorganic pigment or dye, or other suitable light absorbing materials, so as to absorb the light totally reflected to the first optical layer 120 by the cover lens 110 and the light directly incident to the edge of the first optical layer 120, thereby reducing the light leakage from the sidewall of the cover lens 110 or from the edge of the second optical layer 130. For example, the first optical layer 120 may be a prefabricated polarizer and may be disposed on the cover lens 110 by attaching, so as to use the iodide ion or dye in the polarizer to absorb light. In other embodiments, the first optical layer 120 may be a dark organic or inorganic pigment and is coated on the cover lens 110, but the disclosure is not limited thereto.

In one embodiment, the second optical layer 130 may be directly disposed on the first optical layer 120. In other words, the second optical layer 130 is in direct contact with the first optical layer 120. The material of the second optical layer 130 may include an organic pigment or dye, inorganic pigment or dye, or other suitable light-shielding materials with high optical density. For example, the second optical layer 130 may be a dark ink, such as black or brown, and may be disposed on the first optical layer 120 by printing, but the disclosure is not limited thereto. In other embodiments, the second optical layer 130 may also be ink of other colors, which may be adjusted according to the appearance color required by the display device, but the disclosure is not limited thereto. The ink material may reflect light, but the light absorption property of the first optical layer 120 for visible light can reduce the reflection of light by the second optical layer 130 toward the cover lens 110, helping to suppress unexpected brightness of the periphery.

In one embodiment, the first optical layer 120 includes a first opening OP1, the second optical layer 130 includes a second opening OP2, and a position of the first opening OP1 corresponds to a position of the second opening OP2. In some embodiments, a sidewall of the first opening OP1 is substantially flush with a sidewall of the second opening OP2.

In one embodiment, the display device 10 has the display region R1 and a non-display region R2. The non-display region R2 may surround the displayable area R1, but the disclosure is not limited thereto. In one embodiment, a light transmission rate of the second optical layer 130 is smaller than a light transmission rate of the first optical layer 120. That is, the second optical layer 130 may block light at least in the wavelength range of visible light. Therefore, the display region R1 may be defined by the first opening OP1 of the first optical layer 120 or the second opening OP2 of the second optical layer 130, and the non-display region R2 may be defined by the first optical layer 120 and the second optical layer 130. For example, an area range of the first optical layer 120 or the second optical layer 130 may be regarded as the non-display region R2. In some embodiments, the first opening OP1 and the second opening OP2 may have different sizes, for example, the first opening OP1 may be larger than the second opening OP2. In this way, the second optical layer 130 may protrude toward the display region R1 relative to the first optical layer 120, but not limited thereto. In other embodiments, the first opening OP1 may be smaller than the second opening OP2. Although only one layer of the first optical layer 120 and one layer of the second optical layer 130 are shown in FIG. 2, the disclosure is not limited thereto. Either the first optical layer 120 or the second optical layer 130 may have a multi-layer structure, and the number of layers may be adjusted according to actual needs. In some embodiments, the first optical layer 120 may be composed of a stack of one or more polarizers with different directions of absorption axis, and the second optical layer 130 may include one or more light-shielding ink layers.

In one embodiment, the first optical layer 120 and the second optical layer 130 may both be prefabricated polarizers, and the second optical layer 130 may be disposed on the first optical layer 120 by attaching, wherein the first optical layer 120 has a first absorption axis, the second optical layer 130 has a second absorption axis, and a direction of the second absorption axis is different from a direction of the first absorption axis. For example, the direction of the second absorption axis and the direction of the first absorption axis may be perpendicular to each other. In this way, since the direction of the first absorption axis of the first optical layer 120 is different from the direction of the second absorption axis of the second optical layer 130, the effects of light shielding and light absorption can be achieved at the same time, and the light-shielding ink layer can be omitted. In such an embodiment, the first optical layer 120 and the second optical layer 130 have each have a light absorption rate between 40%-50% for visible light.

The display light provided by the display 140 may be scattered or refracted at the edge of the second opening OP2 and emitted from a boundary between the non-display region R2 and the display region R1, or the display light provided by the display 140 may be reflected by the cover lens 110 to travel in the non-display region R2 and be emitted from the sidewall of the cover lens 110, which are all unexpected light leakage. In this embodiment, the first optical layer 120 disposed on the second optical layer 130 has a light-absorbing property, which may absorb the refracted, scattered and/or reflected light to avoid unexpected light leakage, thereby ensuring the display quality of the display device 10.

In summary, the display device of the disclosure includes a first optical layer disposed between a light guide plate and a cover lens, and a second optical layer disposed between the light guide plate and the first optical layer. For visible light, a light absorption rate of the first optical layer is larger than or equal to a light absorption rate of the second optical layer.

Therefore, the light leakage from the sidewall of the cover lens or the edge of the second optical layer can be reduced, thereby improving the problem of light leakage of the display device.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A display device, comprising:
   a light guide plate, having a first surface and a second surface opposite to the first surface;
   a cover lens, disposed on the first surface of the light guide plate;
   a first optical layer, disposed between the first surface and the cover lens;
   a second optical layer, disposed between the first surface and the first optical layer, and for a visible light, a light absorption rate of the first optical layer is larger than a light absorption rate of the second optical layer; and
   a display, disposed on the second surface of the light guide plate.

2. The display device according to claim 1, wherein the first optical layer is disposed on the cover lens.

3. The display device of claim 1, wherein the material of the first optical layer comprises an organic pigment or dye or an inorganic pigment or dye.

4. The display device of claim 1, wherein a light transmission rate of the second optical layer is smaller than a light transmission rate of the first optical layer.

5. The display device of claim 1, wherein the second optical layer is a dark ink, disposed on the first optical layer and in contact with the first optical layer.

6. The display device of claim 1, wherein the first optical layer is attached to the cover lens, and the first optical layer has a first absorption axis.

7. The display device according to claim 6, wherein the second optical layer is attached to the first optical layer, and the second optical layer has a second absorption axis, wherein a direction of the second absorption axis is different from a direction of the first absorption axis.

8. The display device of claim 7, wherein the direction of the second absorption axis and the direction of the first absorption axis are perpendicular to each other.

9. The display device of claim 1, wherein the first optical layer comprises a first opening, the second optical layer comprises a second opening, and a position of the first opening corresponds to a position of the second opening.

10. The display device of claim 1, further comprising an adhesive layer disposed between the light guide plate and the cover lens and covering the first optical layer and the second optical layer.

* * * * *